United States Patent
Veenstra et al.

(10) Patent No.: US 11,738,636 B2
(45) Date of Patent: Aug. 29, 2023

(54) METHODS AND SYSTEMS FOR CONFORMABLE FUEL TANK

(71) Applicant: Ford Global Technologies, LLC, Dearborn, MI (US)

(72) Inventors: Michael J. Veenstra, Southgate, MI (US); Bert Hobein, Aachen (DE); Florian Huth, Cologne (DE); Stella Papasavva, Royal Oak, MI (US); Matthew Riley, Ann Arbor, MI (US); Michael Conrad, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 826 days.

(21) Appl. No.: 16/562,326

(22) Filed: Sep. 5, 2019

(65) Prior Publication Data

US 2021/0070164 A1    Mar. 11, 2021

(51) Int. Cl.
*B60K 15/03* (2006.01)
*F28F 27/00* (2006.01)
*G05D 7/06* (2006.01)
*F17C 13/02* (2006.01)

(52) U.S. Cl.
CPC ............ *B60K 15/03* (2013.01); *F17C 13/026* (2013.01); *F28F 27/00* (2013.01); *G05D 7/0629* (2013.01); *G05D 7/0682* (2013.01); *B60K 2015/0319* (2013.01); *B60K 2015/03171* (2013.01); *B60K 2015/03309* (2013.01); *B60K 2015/03315* (2013.01); *B60K 2015/03414* (2013.01); *B60K 2015/03486* (2013.01); *F17C 2227/0135* (2013.01); *F17C 2250/03* (2013.01)

(58) Field of Classification Search
CPC .......... B60K 15/03; B60K 2015/03309; B60K 2015/03315; B60K 2015/03414; B60K 2015/03486; B60K 2015/03019; B60K 15/03006; B60K 15/073; F17C 13/026; F17C 2227/0135; F17C 2250/03; F28F 27/00
See application file for complete search history.

(56) References Cited

U.S. PATENT DOCUMENTS

| | | |
|---|---|---|
| 7,377,294 B2 | 5/2008 | Handa |
| 7,735,528 B2 | 6/2010 | Handa |
| 9,217,538 B2 | 12/2015 | Griffith et al. |
| 9,440,529 B2 | 9/2016 | Lee |
| 10,337,671 B2 | 7/2019 | Abd Elhamid et al. |
| 2008/0272130 A1 | 11/2008 | Abdel-Baset |

(Continued)

FOREIGN PATENT DOCUMENTS

| | | | |
|---|---|---|---|
| CN | 202361612 U | * | 8/2012 |
| CN | 104508349 A | | 4/2015 |

(Continued)

*Primary Examiner* — Atif H Chaudry
(74) *Attorney, Agent, or Firm* — Vincent Mastrogiacomo; McCoy Russell LLP

(57) ABSTRACT

Filling methods and systems are provided for a conformable fuel tank. In one example, a system comprises an active thermal management arrangement for the conformable fuel tank. The active thermal management arrangement comprises one or more recirculation passage for mixing hot fuel distal to an inlet port of the conformable fuel tank with cool incoming fuel flowing to the inlet port.

18 Claims, 9 Drawing Sheets

(56) References Cited

U.S. PATENT DOCUMENTS

| | | | |
|---|---|---|---|
| 2011/0000798 A1* | 1/2011 | Ornath | F17C 11/005 419/10 |
| 2012/0325832 A1* | 12/2012 | Takeuchi | B64G 1/402 220/661 |
| 2014/0305951 A1 | 10/2014 | Griffith et al. | |
| 2015/0211684 A1* | 7/2015 | Santos | F17C 11/007 137/1 |
| 2016/0348838 A1 | 12/2016 | Griffith et al. | |
| 2016/0363265 A1 | 12/2016 | Griffith et al. | |
| 2017/0028842 A1 | 2/2017 | Lee | |
| 2017/0157837 A1 | 6/2017 | Wexler et al. | |
| 2017/0291328 A1 | 10/2017 | Wexler et al. | |
| 2018/0080609 A1 | 3/2018 | Abd Elhamid et al. | |
| 2018/0111475 A1 | 4/2018 | Wexler et al. | |
| 2018/0283612 A1* | 10/2018 | Wexler | F17C 13/026 |
| 2022/0349522 A1* | 11/2022 | Saade Saade | F17C 1/06 |

FOREIGN PATENT DOCUMENTS

| | | | | |
|---|---|---|---|---|
| CN | 104968987 A | | 10/2015 | |
| CN | 107923572 A2 | | 4/2018 | |
| DE | 102006019993 B3 | | 12/2007 | |
| JP | 2018519480 A | | 7/2018 | |
| KR | 20160009680 A | * | 6/2016 | |
| WO | WO-2008130400 A1 | * | 10/2008 | F24H 1/206 |
| WO | 2013166452 A1 | | 11/2013 | |
| WO | 2016205372 A2 | | 12/2016 | |
| WO | 2017096283 A1 | | 6/2017 | |

\* cited by examiner

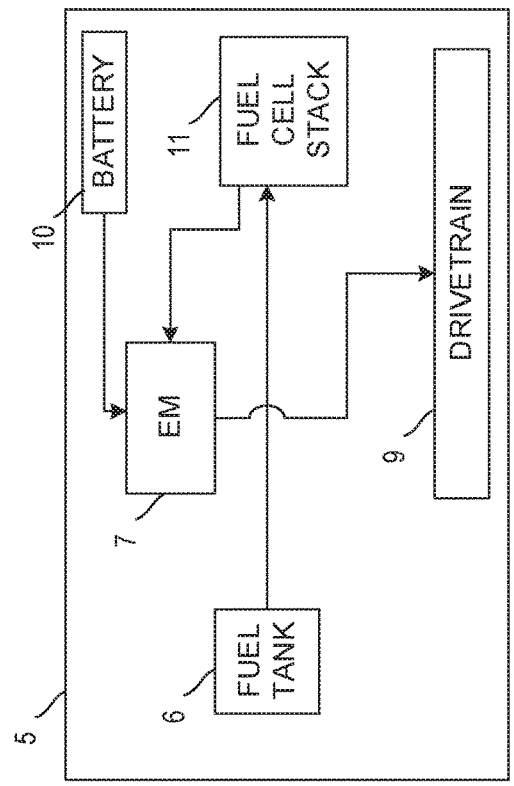
FIG. 1B
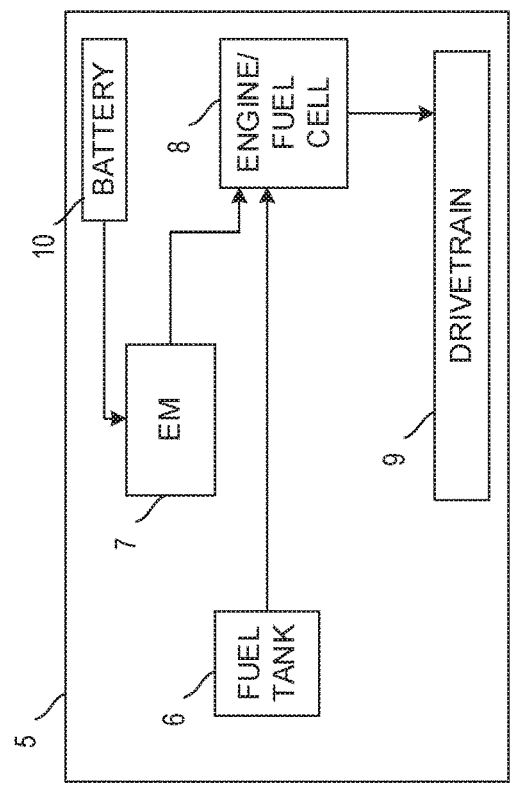
FIG. 1A
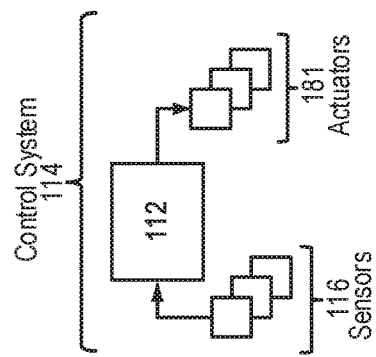

METHODS AND SYSTEMS FOR CONFORMABLE FUEL TANK

FIELD

The present description relates generally to filling a conformable fuel tank.

BACKGROUND/SUMMARY

Alternatives to petroleum-based fuels are becoming increasingly desirable, especially in automotive applications, to decrease greenhouse gas emissions. One hurdle slowing a transition from petroleum fuels to alternative fuels, such as hydrogen or natural gas, may include the container in which they are stored. The container for these alternative fuels are larger than a petroleum fuel tank due to the lower energy density of the fuel and comprise the thick walls to retain high pressures of hydrogen and natural gas, which may increase material costs and increase packaging constraints. Furthermore, decreasing a total volume of the fuel tank may not be desired as this may decrease the driving range of the fuel, resulting in an increased number of fuel tank fill-ups, which may be bothersome to a vehicle operator.

Other attempts to address the volumetric challenge of alternative fuel storage vessels include conformable fuel tanks. One example approach is shown by Elhamid et al. in U.S. Ser. No. 15/267,810. Therein, a conformable fuel tank utilizes first and second ports to flow fuel into a fuel tank. A first fill conduit is connected to the first port and the second fill conduit is connected to the second port. A valve may adjust fuel flow through the first and second fill conduits, through the first and second ports, to a storage vessel. By doing this, fuel flow into the storage vessel may be alternated.

However, the inventors herein have recognized potential issues with such systems. As one example, alternating the fuel flow may not sufficiently decrease a fuel tank fill-up time due to a fuel temperature getting too high. Another approach to accelerate fuel tank fill-up times, shown by Wexler et al. in U.S. 20180283612, includes recirculating fuel from an end of the fuel tank, distal to an inlet of the fuel tank, as the fuel tank fill-up occurs. In this way, hot fuel in the end of the fuel tank may mix with cool fuel entering through the inlet of the fuel tank.

However, the inventors have identified issues with this approach as well. For example, an ejector is used by Wexler, which relies on fuel flow into the vessel to draw fuel from an end of the vessel back to the inlet to mix with cooler, incoming fuel flow. Thus, the ejector may not be used outside of refueling conditions where additional mixing would be desirable to control the fuel temperatures below the threshold temperature.

In one example, the issues described above may be addressed by a system for a conformable fuel tank comprising a multi-flow inlet configured to flow fuel to a first half and a second half of the conformable fuel tank, the conformable fuel tank further comprises a first recirculation passage having a first pump and a second recirculation passage having a second pump, wherein each of the first and second recirculation passages are fluidly coupled to a conduit upstream of the multi-flow inlet. In this way, fuel temperatures may be reduced while a fuel fill-up rate may be maintained or increased.

As one example, an active thermal management arrangement may be configured to decrease a temperature of the conformable fuel tank. The active thermal management arrangement may include the recirculation passages along with a coolant passage configured to dissipate heat from the conformable fuel tank. The coolant passage may be in thermal contact with hotter portions of the conformable fuel tank, such as portions distal to an inlet port where the fuel is hotter due to a heat of compression. By doing this, fuel fill-up rates may be increased, thereby saving a vehicle operator time.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1A and 1B illustrate a conformable tank in an alternative fuel vehicle and a schematic of an alternative fuel vehicle powertrain.

DETAILED DESCRIPTION

Figure 1C:
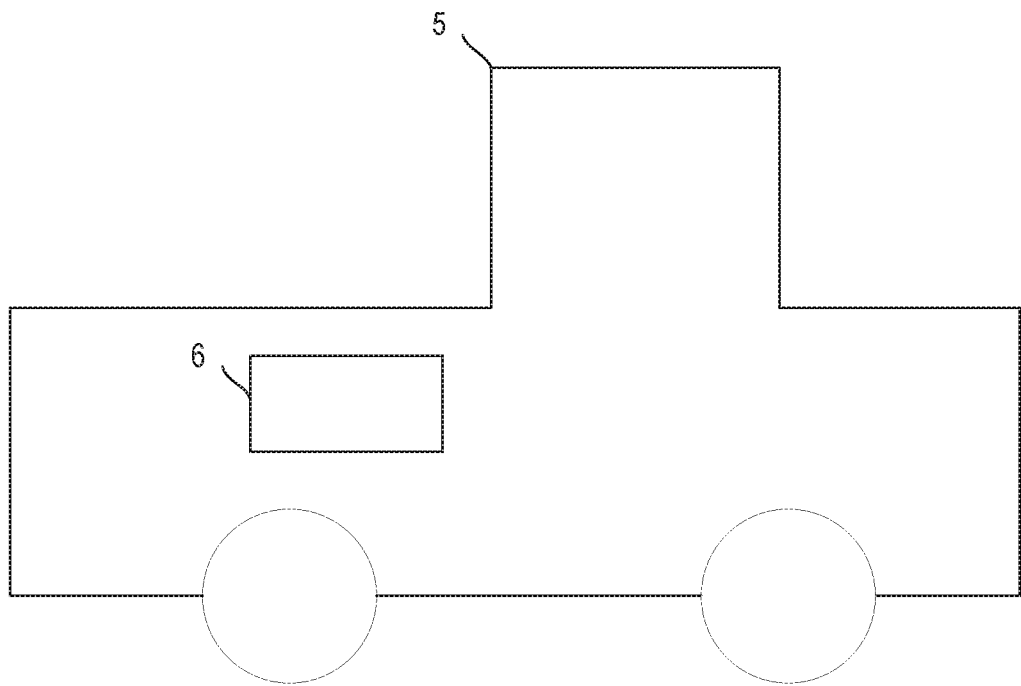
FIG. 1C illustrates an example location of a conformable fuel tank in a vehicle.
Figure 2A:
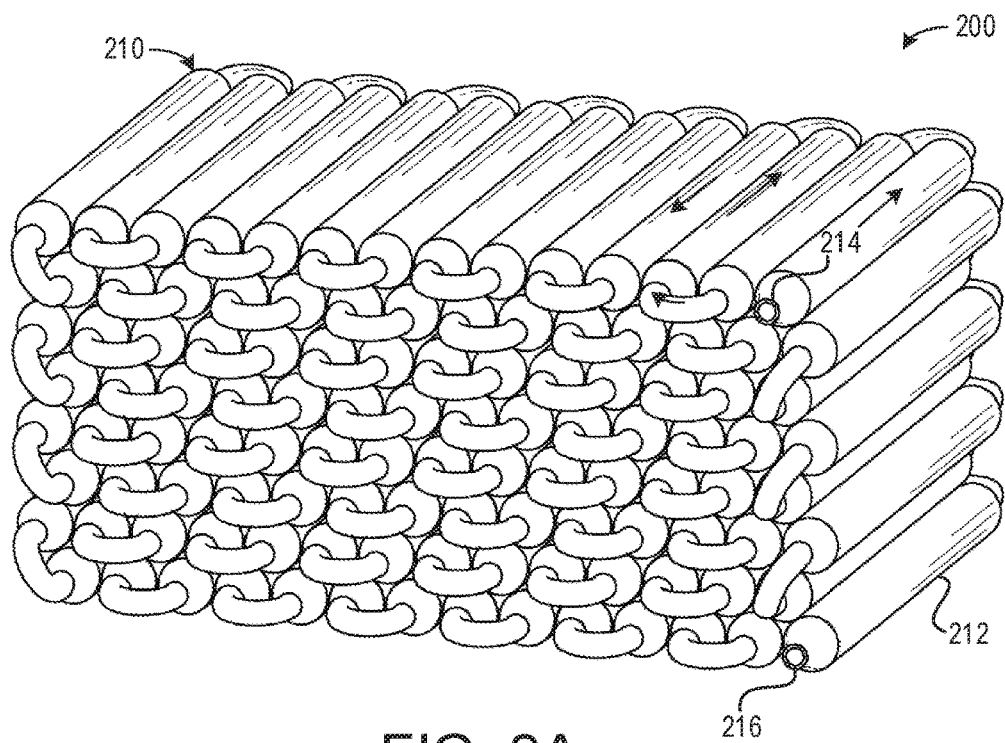
FIGS. 2A and 2B illustrate a first example of a conformable fuel tank.
Figure 2B:
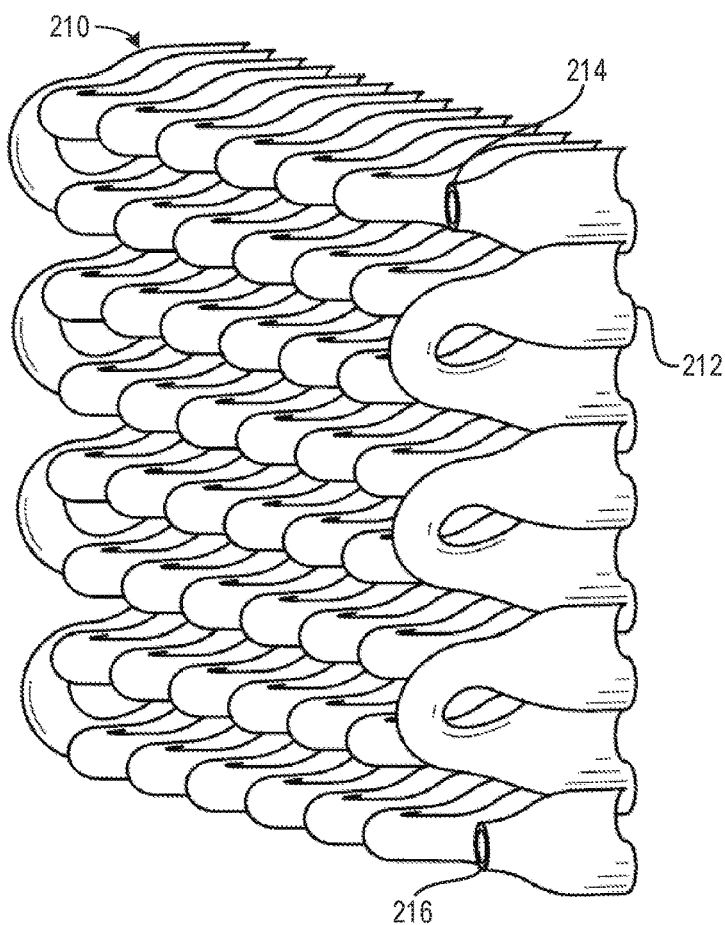
Figure 3:
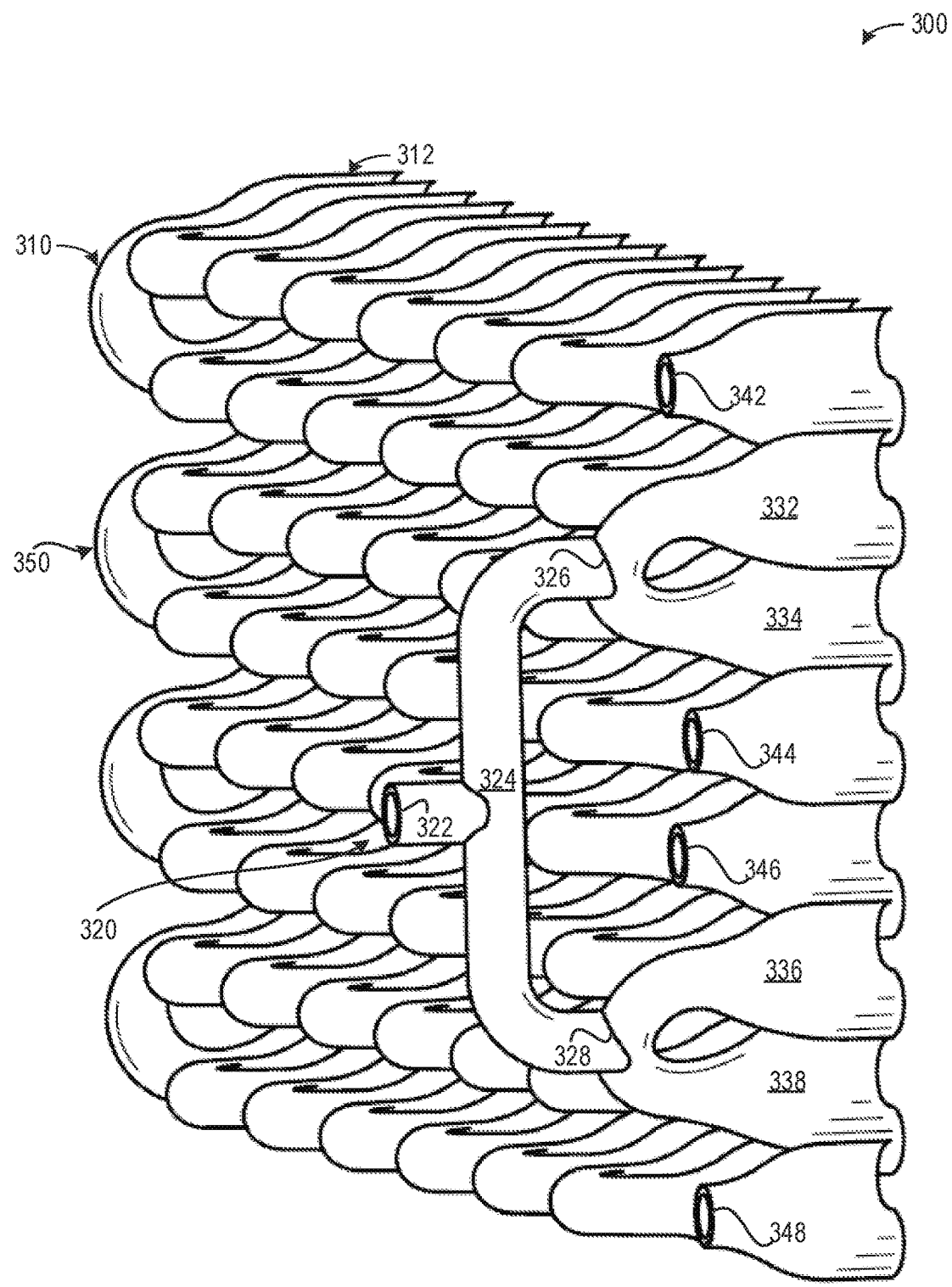
FIG. 3 illustrates a second example of a conformable fuel tank.

The following description relates to systems and methods for a conformable fuel tank. The conformable fuel tank may be shaped to fit into an available packaging space of a vehicle, such as the alternative fuel vehicle illustrated in FIGS. 1A and 1B. FIG. 1C illustrates an example arrangement of a conformable fuel tank in the vehicle. The conformable fuel tank may utilize a variety of packaging techniques that may decrease a profile of the fuel tank. Fuel stored in the fuel tank may include a variety of compositions including natural gas, that may be stored as a compressed natural gas (CNG) or as an adsorbed natural gas approach. An example of a conformable fuel tank is shown in FIGS. 2A and 2B, wherein the conformable fuel tank deviates from previous examples of a fuel tank shape (e.g., cylinder, etc.). An example of a conformable fuel tank with a split inlet flow is illustrated in FIG. 3. The split inlet flow conformable fuel tank may be configured to increase conformable tank fill-up rates while also decreasing fuel temperatures therein.

Figure 4:
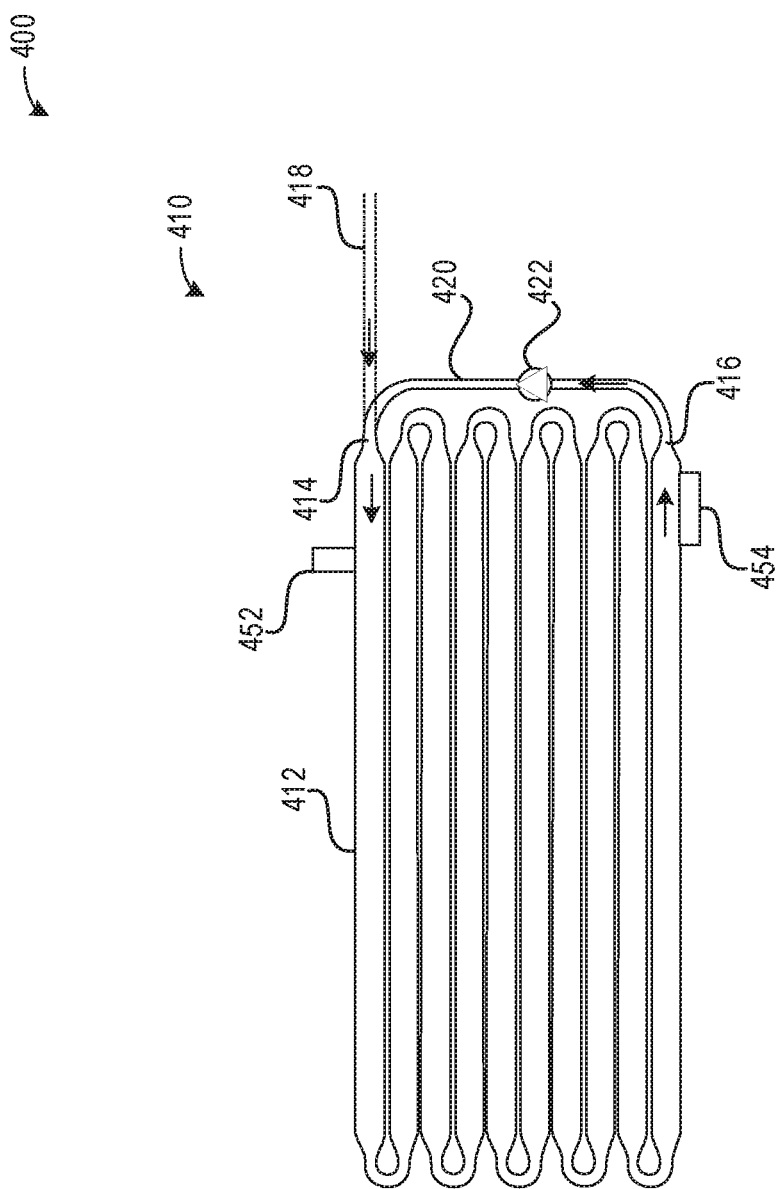
FIG. 4 illustrates a third example of a conformable fuel tank comprising a pump configured to recirculate fuel in the fuel tank.
Figure 5:
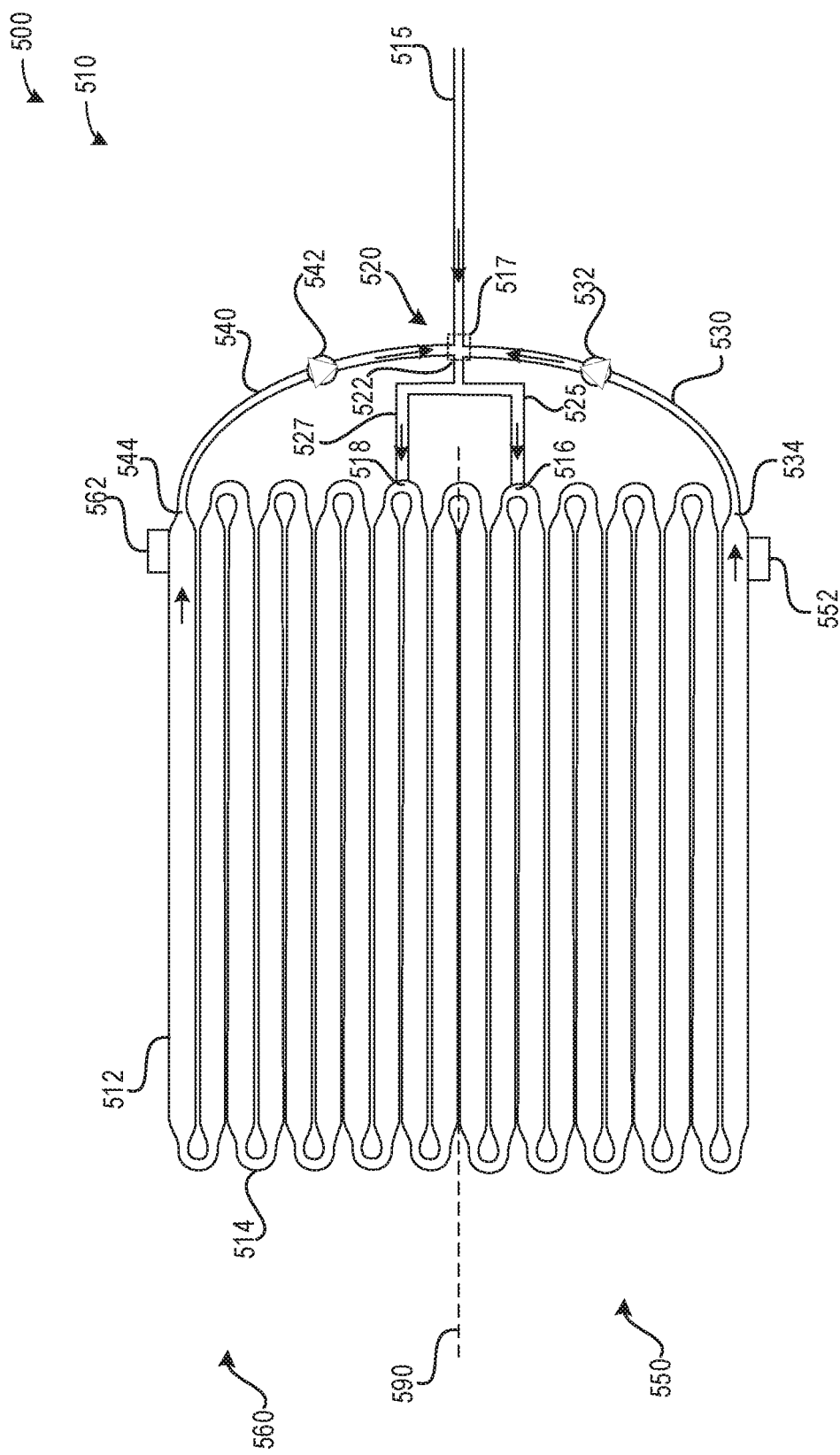
FIG. 5 illustrates a fourth example of a conformable fuel tank comprising two pumps configured to recirculate fuel from opposite ends of the fuel tank.
Figure 6:
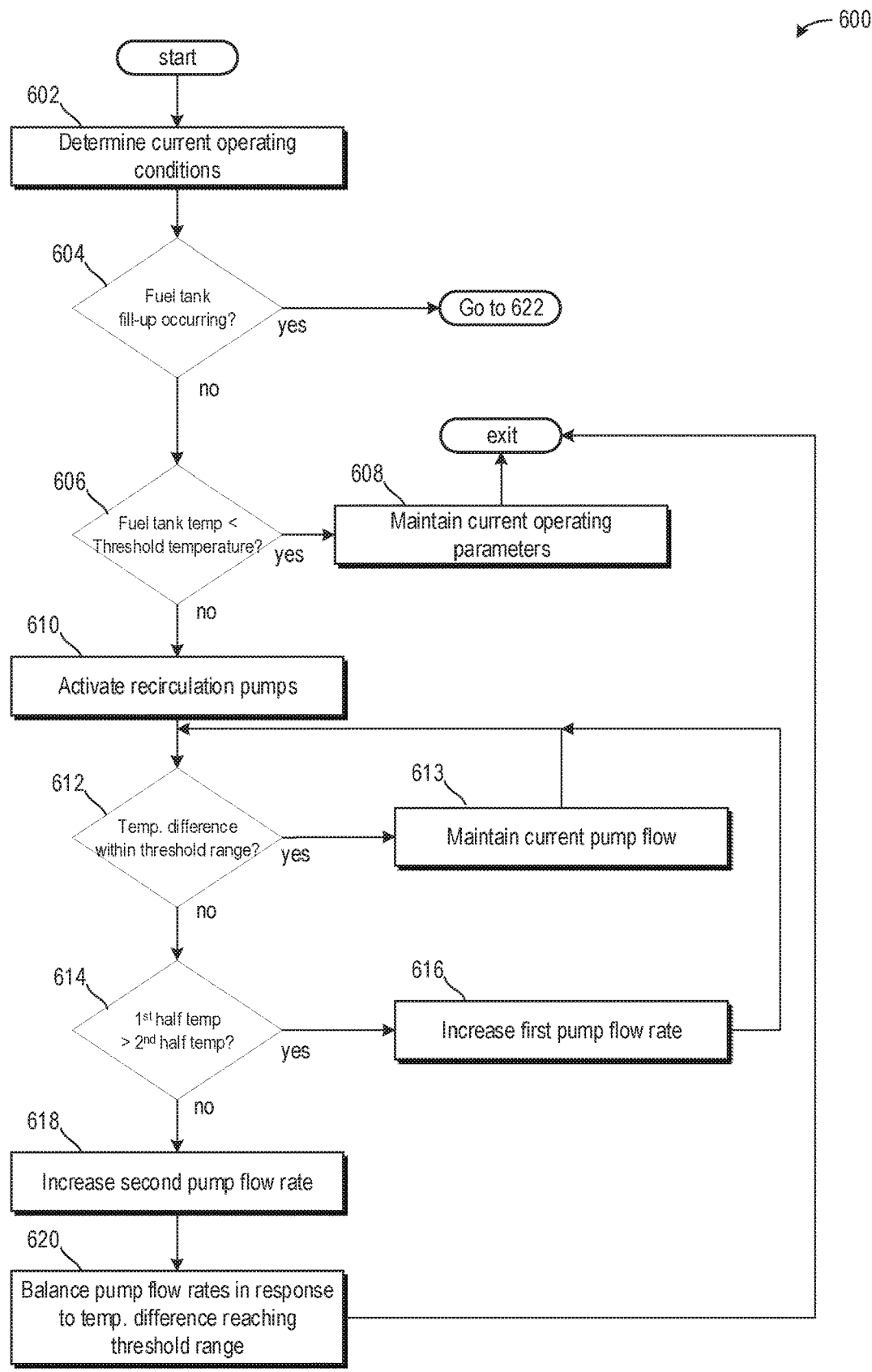
FIG. 6 illustrates a method for operating recirculating pumps and an inlet valve of a conformable fuel tank based on a temperature of the fuel tank.
Figure 6:
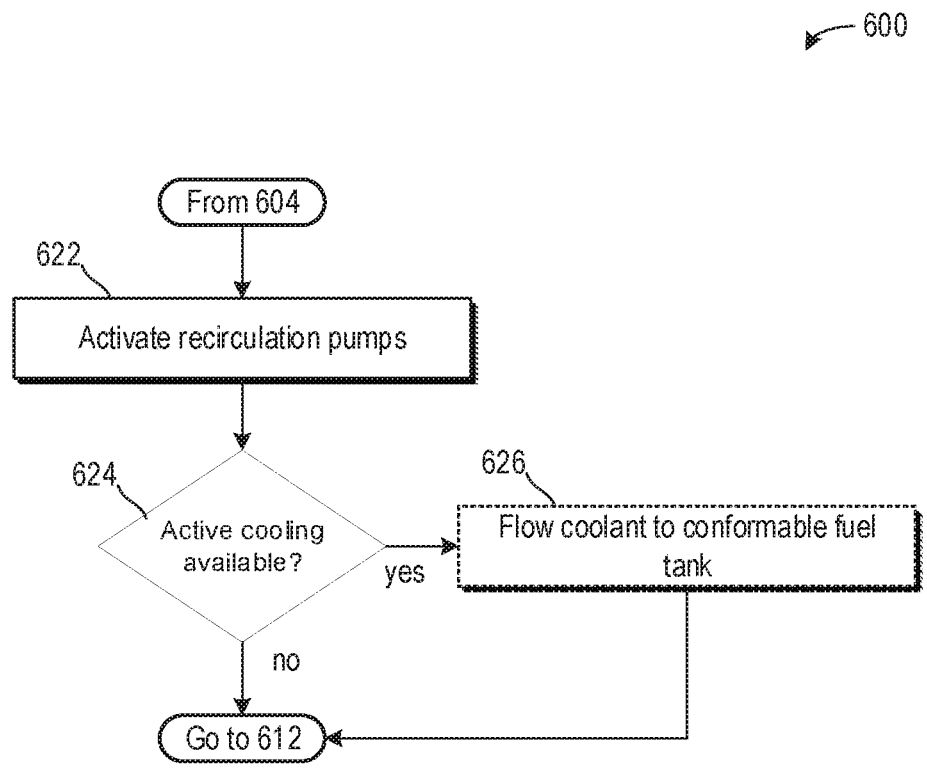

A conformable fuel tank comprising a recirculating pump arranged to flow fuel from a distal end of the fuel tank to an inlet is illustrated in FIG. 4. The pump may recirculate fuel during conditions where a fuel temperature is greater than a threshold temperature. The pump may be activated during refueling and non-refueling events. A method for operating the pump is illustrated in FIG. 6. In one example, a conformable fuel tank may comprise each of a split flow inlet and pumps for recirculating fuel from distal ends of disparate halves of the conformable fuel tank, as shown in FIG. 5. FIGS. 7A-7D illustrate various active and passive thermal management arrangements of the conformable fuel tank for promoting heat transfer from fuel arranged therein to an ambient atmosphere or to a coolant.

FIGS. 1A-5 and 7A-7D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIGS. 1A and 1B, they show a vehicle 5 comprising a fuel storage system 6 and an engine/fuel cell 8. The vehicle 5 may be an internal combustion engine vehicle with hybrid battery as shown in the example of FIG. 1A and a fuel cell electric vehicle with hybrid battery in the example of FIG. 1B. As such, the fuel storage system 6 may include one or more fuel tanks. The fuel tank may be a conformable fuel tank configured to store fuels alternative to diesel and gasoline, such as hydrogen and natural gas. The conformable fuel tank is illustrated in an example location with respect to FIG. 1C.

The fuel storage system 6 may be coupled to the engine/fuel cell 8. The fuel storage system 6 may provide a fuel source to the engine/fuel cell 8. More specifically, in an internal combustion engine example where the fuel source is natural gas or hydrogen, the fuel storage system 6, which may be an energy storage device in one example, may provide natural gas or hydrogen to the engine 8 to combust, resulting in power transferred to the drivetrain 9 of the vehicle 5. As another example as shown in the embodiment of FIG. 1B, if the fuel source is hydrogen, the energy storage device 6 may provide hydrogen to the fuel cell stack 11 to generate electricity, wherein the electricity may be used to actuate the vehicle 5 via the electric motor 7. In this way, the electric motor 7 may be powered by the fuel cell stack 11 and the battery 10

Control system 114 is shown receiving information from a plurality of sensors 116 (various examples of which are described herein) and sending control signals to a plurality of actuators 181 (various examples of which are described herein). Sensors such as additional pressure, temperature, air/fuel ratio, and composition sensors may be coupled to various locations in the vehicle 5. As another example, the sensors may include temperature sensors coupled to the fuel storage system 6 and actuators configured to adjust fuel flow from the fuel storage system to the engine/fuel cell 8.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

Turning now to FIGS. 2A and 2B, it shows an embodiment 200 of a fuel tank 210. In one example, the fuel tank 210 is a conformable fuel gas storage tank configured to store and hold natural gas or hydrogen aboard a vehicle, such as the vehicle 5 of FIGS. 1A and 1B. Natural gas, as known to those of ordinary skill in that art, is a combustible fuel in an internal combustion engine composed primarily of methane ($CH_4$). Hydrogen gas ($H_2$), as known to those of ordinary skill in that art, is a combustible fuel in an internal combustion engine or a reactant fuel in a fuel cell. The conformable fuel tank 210 may comprise different shapes and designs based on a packaging space available to the tank.

In the examples of FIGS. 2A and 2B, the conformable fuel tank 210 comprises a plurality of cylinders 212 fluidly coupled to one another and arranged in a grid and/or matrix. The grid may comprise a height of seven cylinders and a length of 14 cylinders. However, as described above, the dimensions and shape of the conformable fuel tank 210 may be adjusted based on a packaging space of the vehicle on which it is arranged.

In one example, the conformable fuel tank 210 is a segmented storage container with the plurality of cylinders 212 being connected in series, or in another configuration, if desired. The plurality of cylinders 212 may be daisy chained to one another, in one example. In one example, a first cylinder of the plurality of cylinders 212 may shape a first segment of the conformable fuel tank 210 and a second cylinder of the plurality of cylinders 212 may shape a second segment of the conformable fuel tank 210. Each of the plurality of cylinders 212 may be hollow and comprise an interior volume configured to store fuel or the like in a solid, liquid, or gaseous phase.

The conformable fuel tank 210 comprises an inlet 214 and an outlet 216. The inlet 214 may be configured to receive fuel from a fuel tank fill-up nozzle and the outlet 216 may be configured to flow fuel to a fuel rail of the vehicle, from where the fuel may be injected into an engine (e.g., engine 8 of FIG. 1A) or fuel cell of the vehicle. The arrangement of the conformable fuel tank 210 may be such that fuel passing through the inlet 214 is forced to flow through each and every cylinder of the plurality of cylinders 212 before reaching the outlet 216.

In the examples of FIGS. 2A and 2B, the inlet 214 is arranged on a first cylinder of the plurality of cylinder 212 and the outlet 216 is arranged on a last cylinder of the plurality of cylinders 212. The first cylinder receives fuel before any other cylinder of the conformable fuel tank 210. Fuel in the first cylinder may sequentially flow through each of the plurality of cylinders before reaching the last cylinder where the outlet 216 is arranged. Arrows in the figure illustrate an example fuel flow path. As such, each cylinder of the plurality of cylinders is fluidly coupled to only adjacent cylinders of the conformable fuel tank 210. As shown, adjacent cylinders may direct fuel flow in opposite directions.

Turning now to FIG. 3, it shows an embodiment 300 of a conformable fuel tank 310 that may be arranged on a vehicle, such as vehicle 5 of FIGS. 1A, 1B, and 1C. The embodiment 300 may differ from the embodiment 200 in that the conformable fuel tank 310 comprises a split flow inlet 320 configured to flow gas to multiple cylinders of a plurality of cylinders 312 of the conformable fuel tank 310.

The split flow inlet 320 comprises a first conduit 322 configured to feed fuel to a second conduit 324. Arrows illustrate an example fuel flow through the split flow inlet 320. The first conduit 322 may intersect and be fluidly coupled with the second conduit 324 at a central portion of the second conduit 324. As such, fuel from the first conduit 322, may flow through the second conduit 324 toward a first outlet 326 or a second outlet 328. The first outlet 326 may provide fuel each of a first cylinder 332 and a second cylinder 334 of the plurality of cylinder 312 of the conformable fuel tank 310. The second outlet 328 may provide fuel to each of a third cylinder 336 and a fourth cylinder 338. The first cylinder 332 is directly adjacent to the second cylinder 334, wherein directly adjacent cylinders may comprise where exterior surfaces of the cylinders are in face-sharing contact with one another. The third cylinder 336 is directly adjacent to the fourth cylinder 338. More specifically, the first outlet 326 may be fluidly coupled to a first link of a plurality of links 350 and the second outlet may be fluidly coupled to a second link of the plurality of links 350.

Each link of the plurality of links 350 may fluidly couple one cylinder of the plurality of cylinder 312 to another cylinder of the plurality of cylinders 312. Each link may comprise a U-shape and a circular cross-section. Thus, by fluidly coupling the first outlet 326 to the first link, a flow of fuel may be split. Likewise, the flow of fuel may be split where the second outlet 328 is fluidly coupled to the second link. Overall, the fluid flow through the split flow inlet may be split twice, once at the second conduit 324 and again at the outlets, thereby allowing a single inlet manifold to flow fuel to four distinct cylinders of the plurality of cylinders. By doing this, a fuel fill-up rate may be reduced and a temperature of fuel in the conformable fuel tank 310 may decrease.

The conformable fuel tank 310 further comprises a first fuel outlet 342, a second fuel outlet 344, a third fuel outlet 346, and a fourth fuel outlet 348. In one example, each of the fuel outlets provides fuel to a fuel rail, wherein the fuel may be injected into an engine for combustion or the fuel cell. Additionally or alternatively, one or more of the fuel outlets may be used for fuel recirculation purposes as will be described with respect to FIG. 4.

It is desired to continuously decrease fuel fill-up rates, and doing so in the example of FIG. 3 may result in a temperature of fuel in the conformable fuel tank 310 exceeding a threshold temperature. More specifically, fill-up rates may be limited due to a heat of compression that is generated during a fill of natural gas or hydrogen. The fuel may be compressed, for example, from a low pressure of 20 bar to a high pressure of 250 bar for natural gas or 700 bar for hydrogen. Additionally for hydrogen, the conformable fuel tank may restrict the flow of the fuel with the small diameter shape such that a Joule-Thomson effect may further increase a temperature of the fuel. In one example, the threshold temperature may be equal to 85° C. as a maximum temperature rating of the tank. However, it will be appreciated that the threshold temperature may be equal to different values. For example, the threshold temperature may be less than 85° C. as a buffer from the maximum temperature rating, or greater than 85° C. if a different maximum temperature rating is established for the tank. Unlike traditional fuel tanks that store a bulk amount of fuel within a single volume, thermal management within the conformable fuel tank may be limited due to the divided nature of the conformable fuel tank. That is, due to the daisy chain arrangement of the cylinders of the conformable fuel tank, fuel inserted at a beginning of a fuel tank fill-up may not mix with cooler, incoming fuel, thereby resulting in hot fuel being arranged distal to the conformable fuel tank inlet.

By implementing a fuel recirculation passage, such as the recirculation passages illustrated in FIGS. 4 and 5, hot fuel distal to a location in which the fuel is introduced to the conformable fuel tank, may mix with cooler, incoming fuel such that a temperature of fuel in the conformable fuel tank may decrease. Mixing already stored fuel with incoming fuel may decrease the fuel temperature to a temperature less than the threshold temperature. As such, a desired temperature profile of the conformable fuel tank may be maintained.

Turning now to FIG. 4, it shows an embodiment 400 of a conformable fuel tank 410 comprising a plurality of cylinders 412 fluidly coupled in series. The conformable fuel tank 410 may be a non-limiting example of the conformable fuel tank 210 of FIG. 2A or the conformable fuel tank 310 of FIG. 3. The conformable fuel tank 410 further comprises a recirculation passage 420 fluidly coupling an outlet 416 to an inlet 414 of the conformable fuel tank. The recirculation passage 420 may comprise a pump 422, which may be optionally activated to flow fuel from the outlet 416, which is distal to the inlet 414, to an incoming fuel passage 418. The incoming fuel passage 418 may be configured to flow fuel to the conformable fuel tank. An extreme end of the incoming fuel passage 418, opposite to the inlet 414, may be arranged on an exterior of the vehicle such that a user may dispense fuel into the incoming fuel passage 418 via a fuel nozzle or other fuel dispensing device at a fuel station.

The pump 422 may be activated to recirculate fuel in response to a temperature of fuel in the conformable fuel tank 410 during the entire fueling to avoid approaching the threshold temperature (e.g., within 10% of the threshold temperature). Thus, to decrease the fuel temperature so that the threshold temperature is not exceeded, the pump 422 is activated so that fuel in the conformable fuel tank 410 may mix with cooler, incoming fuel. In this way, fuel near the outlet 416 and distal to the inlet 414 may be blocked from exceeding the threshold temperature, thereby increasing a longevity of the conformable fuel tank 410.

The pump 422 may be electronically, pneumatically, hydraulically, or mechanically activated. In some examples, the intersection where the recirculation passage 420 and the incoming fuel passage 418 meet may comprise a venturi device or other vacuum device to assist the pump 422 in flowing fuel from the recirculation passage 420 to the inlet 414. Conditions where the pump 422 may be activated are described in greater detail below with respect to FIG. 6.

Operation of the pump 422 may be based on feedback from one or more of a first temperature sensor 452 and a second temperature sensor 454. The first temperature sensor 452 may provide an indication of a temperature of fuel entering the conformable fuel tank 410. The second temperature sensor 454 may provide an indication of a temperature of fuel at a distal end of the conformable fuel tank 410. The pump 422 may be adjusted in response to a temperature sensed by the second temperature sensor 454 exceeding a threshold temperature (e.g., 85° C.). In some examples, a flow rate of the pump may be adjusted in response to a difference between the temperature sensed by the second temperature sensor 454 and the threshold temperature, wherein the flow rate may be increased as the difference increases. The first temperature sensor 452 may then provide an indication a temperature of a fuel mixture, the mixture including the recirculated fuel and incoming fuel. In some examples, a target temperature may be set based on the temperature of the fuel sensed by the second temperature sensor. If the target temperature is not met, then the pump 422 may be adjusted to adjust a flow rate of fuel through the recirculation passage 420 to meet the target temperature. For example, if the temperature of the fuel mixture is still too high, then the flow rate may be increased. However, it the target temperature is met, and a desired cooling is achieved, then the fuel pump flow rate may be maintained. As another example, if the threshold temperature is not exceeded and recirculation is not demanded, the pump may be maintained deactivated such that fuel recirculation is blocked through the recirculation passage 420. In addition, the pump 422 may continue to be active after the fill is complete to achieve a lower and homogenous temperature in the conformable tank 410.

Turning now to FIG. 5, it shows an embodiment of a conformable fuel tank 510 comprising a plurality of cylinders 512 fluidly coupled in series. The plurality of cylinder 512 may be fluidly coupled via a plurality of links 514. The plurality of links 514 may also be referred to as connecting conduits 514. In one example, the conformable fuel tank 510 may represent a non-limiting example of a combination of the conformable fuel tank 310 of FIG. 3 and the conformable fuel tank 410 of FIG. 4. As such, the conformably fuel tank 510 comprises a multi-flow inlet 520, a first recirculation passage 530, and a second recirculation passage 540.

The multi-flow inlet 520 may be configured to provide fuel to a first port 516 and a second port 518. The first port 516 may be arranged on a first half 550 of the conformable fuel tank 510 and the second port 518 may be arranged on a second half 560 of the conformable fuel tank 510. The first half 550 and the second half 560 may be defined by an axis 590. It will be appreciated that the first half 550 and the second half 560 may be in fluid communication with one another and are divided by the axis 590 for illustrative purposes.

A supply of product (e.g., fuel) may be provided via an incoming conduit 515. Fuel flow may split at the multi-flow inlet 520 and flow through a first conduit 525 to the first port 516 or through a second conduit 527 to the second port 518.

As the refueling occurs, temperatures of each of the first half 550 and the second half 560 may be elevated as fuel is compressed through the plurality of cylinders 512. This may occur even with alternating fuel flow through the first outlet conduit 525 and the second outlet conduit 527 by alternating the first outlet 524 and the second outlet 526 between open and closed positions. As such, to maintain a refueling flow rate, a first pump 532 in a first recirculation passage 530 or a second pump 542 in a second recirculation passage 540 may be activated to recirculate hot fuel to the incoming conduit 515 to mix with cooler, incoming fuel in the incoming conduit 515. In one example, the incoming conduit 515 comprises a venturi 517 at an intersection between the incoming conduit 515 and the first recirculation passage 530 and the second recirculation passage 540. The first and second pumps 532, 542 may assist the optional venturi 517 to recirculate fuel. However, it will be appreciated that the venturi 517 may be omitted.

As fuel flows through the incoming conduit 515 and to the first half 550 and the second half 560, the first recirculation pump 532 and the second recirculation pump 542 may be activated in response to a temperature of the conformable fuel tank 510 exceeding a threshold temperature. However, if the temperature of the conformable fuel tank 510 does not exceed the threshold temperature, then the first fuel pump 532 and the second fuel pump 542 may remain deactivated, which may block the recirculation of fuel. As such, the embodiment 500 may be free of valves and other flow control devices, thereby decreasing a complexity of the temperature management of the conformable fuel tank 510.

In one example, the flow rates of the first pump 532 and the second pump 542 may be adjusted to adjusted a recirculation flow rate from the first half 550 or the second half 560 of the fuel tank. For example, if a first half temperature is greater than a second half temperature, then a flow rate of the first pump 532 may be higher than a flow rate of the second pump 542. Conversely, if the second half temperature is greater than the first half temperature, then the second pump 542 flow rate may be higher than the first pump 532 flow rate.

Turning now to FIG. 6, it shows a method 600 for fueling a conformable fuel tank. Instructions for carrying out method 600 may be executed by a controller based on instructions stored on a memory of the controller and in conjunction with signals received from sensors of the engine system, such as the sensors described above with reference to FIGS. 1A and 1B.

The method 600 begins at 602, which includes determining current operating conditions. Current operating conditions may include, but are not limited to, one or more vehicle operation states such as start-up, running, shut-down, fueling.

The method 600 proceeds to 604, which includes determining if a fuel tank fill-up is occurring. The fuel tank fill-up may be occurring if fuel is being dispensed to a fuel filler pipe (e.g., incoming conduit 515

If the fuel tank fill-up is not occurring, then the method 600 proceeds to 606 to determine if the fuel tank temperature is less than the threshold temperature. The threshold temperature may equal to a temperature less than 85° C. Additionally or alternatively, the threshold temperature may be less than or greater than a temperature of 85° C. In one example, the threshold temperature is based on a temperature within a percentage (e.g., within 10%) of an upper limit temperature of the conformable fuel tank, wherein the upper limit temperature is based on a fuel temperature where degradation of surfaces of the fuel tank may occur (e.g., warping, cracking, etc.) The fuel tank temperature may be based on feedback from one or more temperature sensors coupled to the fuel tank, such as the first temperature sensor 552 and the second temperature sensor 562 of FIG. 5.

If the fuel tank temperature is less than the threshold temperature, then the method 600 proceeds to 608, which includes maintaining current operating conditions and does not activate the recirculation pumps, such as the first pump 532 and the second pump 542.).

If the fuel tank temperature is not less than the threshold temperature (e.g., greater than or equal to), then the method 600 proceeds to 610 to activate the recirculation pumps, such as the first pump 532 and/or the second pump 542. As such, fuel from portions of the fuel tank distal to a multi-inlet port may be recirculated and mix with cooler portions of fuel near the multi-inlet port via a first and/or a second recirculation passage. In the example of FIG. 4, the method 600 may include activating only one recirculation pump. As such, fuel may only flow from a single distal end of the conformable fuel tank to mix with incoming fuel flow.

The method 600 proceeds to 612, which includes determining if a temperature difference between a first half of the fuel tank and a second half of the fuel tank is within a threshold range. flowing coolant to the conformable fuel tank. In one example, the temperature difference may be based on a difference between feedback from a first temperature sensor (e.g., temperature sensor 552 of FIG. 5) and a second temperature sensor (e.g., temperature sensor 562 of FIG. 5). The temperature difference between a first half of the fuel tank and a second half of the fuel tank may occur due to initial temperature conditions of the tank, variation in the fuel flow, or other reasons. The increase in pump flow for a particular half of the tank can reduce and balance the temperature with the opposite half of the tank.

If the temperature difference is within the threshold range, then the method 600 proceeds to 613 to maintain a current pump flow rate and does not adjust a flow rate of the first pump or of the second pump. The method may continue to monitor the temperature difference between the first half and the second half.

If the temperature difference is outside of the threshold range, then the method 600 proceeds to 614 to determine if the first half temperature is greater than the second half temperature. In one example, the first half temperature is greater than the second half temperature is a value of the temperature difference is a positive integer. Additionally or alternatively, the first half temperature may be greater than the second half temperature if feedback from the first temperature sensor indicates a higher temperature value than feedback from the second temperature sensor.

If the first half temperature is greater than the second half temperature, then the method 600 proceeds to 616, which includes increasing the first pump flow rate. An amount in which the first pump flow rate increases may be proportional to a difference between the first half temperature and the second half temperature. In one example, as the difference increases, the first pump flow rate may be proportionally increased. The method 600 may return to compare the temperature difference between the two halves to the threshold range.

If the first half temperature is not greater than the second half temperature (e.g., less than the second half temperature), then the method 600 proceeds to 618 to increase the second pump flow rate. An amount in which the second pump flow rate is increased may be proportional to a difference between the second half temperature and the first half temperature. In one example, as the difference increases, the second pump flow rate may be proportionally increased.

The method 600 proceeds to 620 to balance the pump flow rates in response to a temperature difference reaching (e.g., becoming equal to a temperature difference within) the threshold range.

Returning to 606, if the fuel tank fill-up is occurring, then the method 600 proceeds to 622, which includes activating the recirculation pumps.

The method 600 proceeds to 624 to determine if active cooling is available. Active cooling may be available if vehicle is equipped with these devices.

Figure 7B:
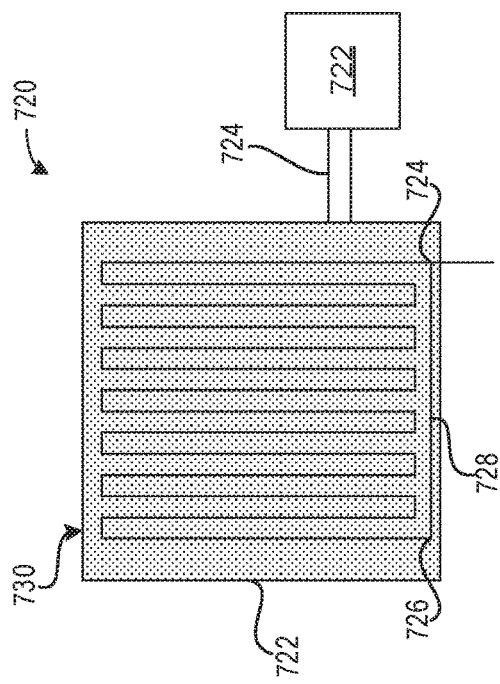
FIGS. 7A-7C illustrate various examples of an active cooling arrangement of a conformable fuel tank.

If active cooling is available, then the method 600 proceeds to 626 to flow coolant to the conformable fuel tank. Example embodiments of coolant flow to the conformable fuel tank are illustrated in FIGS. 7A, 7B, and 7C. Coolant may be in contact with exterior surfaces of the conformable fuel tank such that heat from the fuel within the tank may be passed to the coolant, thereby decreasing a temperature of the fuel therein. Additionally or alternatively, coolant may contact exterior surfaces of the recirculation passages, wherein fuel in the recirculation passages may be at least partially cooled before reentering the conformable fuel tank. By doing this, the recirculation of fuel and coolant flow may decrease a temperature less than or equal to the threshold temperature.

In some examples, 626 of method 600 may be optional, wherein even if active cooling is available, active cooling may not be selected due to fuel economy or other reasons.

At any rate, whether or not active cooling is available, the method 600 proceeds to 612 following 622 to determine if the temperature difference between the first half and the second half of the conformable fuel tank is within the threshold range, as described above.

Turning now to FIG. 7A, it shows an embodiment 700 of a conformable fuel tank 710. The conformable fuel tank 710 may be a non-limiting example of any of the conformable fuel tanks illustrated in FIGS. 2A-5. A coolant passage 706 may extend through a housing of the conformable fuel tank 710 from a coolant system 704 to an engine 702 or other device that demands coolant (e.g., transmission, EGR cooler, or the like). The coolant passage 706 may traverse the conformable fuel tank in a location adjacent to an inlet 712, an outlet 714, and a recirculation passage 716. As such, a proximity of the coolant passage 706 and the inlet 712, outlet 714, and recirculation passage 716 may result in thermal communication between fuel in the conformable fuel tank 710 and coolant in the coolant passage 706.

In one example, the coolant passage 706 may twist and/or turn through gaps between cylinders of the conformable fuel tank 710. Additionally or alternatively, the coolant passage 706 may comprise cut-outs therein shaped to receive portions of the cylinders of the conformable fuel tank 710. As such, coolant in the coolant passage 706 may flow around the portions of the cylinders in the coolant passage 706 without mixing with fuel in the cylinders.

Turning now to FIG. 7B, it shows an embodiment 720 of a conformable fuel tank 730. The conformable fuel tank 730 comprises an inlet 724, an outlet 726, and a recirculation passage 728 arranged in a housing 722. The housing 722 may be hollow and comprises an interior volume in which cylinders of the conformable fuel tank 730 are arranged. The interior volume may be further configured to receive coolant from a coolant system 722 via a coolant passage 724. As such, coolant may enter the interior volume and flow through gaps and spaces between cylinders of the conformable fuel tank that store fuel. As such, thermal management of the conformable fuel tank 730 may be enhanced relative to tanks without coolant flow. In some examples, a valve, a pump, or other flow control device may be arranged between the coolant system 722 and the conformable fuel tank 730 in the coolant passage 724 to adjust a flow of coolant to the interior volume of the housing 722. In some examples, the flow of coolant to the interior volume may be reduced if coolant demands at high priority components (e.g., an engine) are higher.

Turning now to FIG. 7C, it shows an embodiment 740 of a coolant system 742 comprising a coolant passage 744 configured to twist around a cylinder 750 of a conformable fuel tank. In one example, the conformable fuel tank is a non-limiting example of one of the conformable fuel tanks illustrated in FIGS. 2A-5, 7A, and 7B. The cylinder 750 may be configured to store fuel. Additionally or alternatively, the cylinder 750 may correspond to a pipe shaping a recirculation passage. In one example, the cylinder 750 may be representative of each portion of a conformable fuel tank that is configured to store and/or flow fuel. As such, the coolant passage 744 may wrap around the cylinders, recirculation passages, multi-flow inlet, and the like. In one example, the cylinder 750 is distal to an inlet of the conformable fuel tank. As such, the cylinder 750 may represent a location of the conformable fuel tank where temperatures may be highest. In this way, manufacturing costs of the conformable fuel tank and the coolant system 742, including the coolant passage 744, may be reduced relative to wrapping the coolant passage 744 around an entirety of the conformable fuel tank.

Figure 7D:
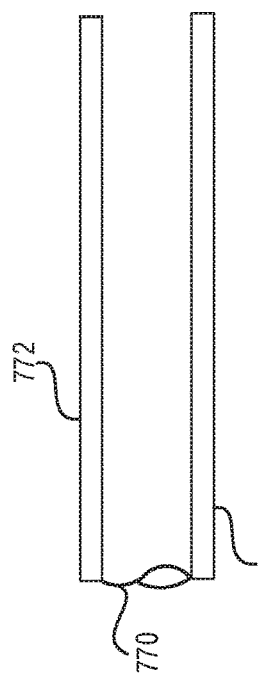
FIG. 7D illustrates example materials arranged on portions of the conformable fuel tank for enhancing heat transfer from the conformable fuel tank to an ambient atmosphere or the active cooling arrangement.
Figure 7A:
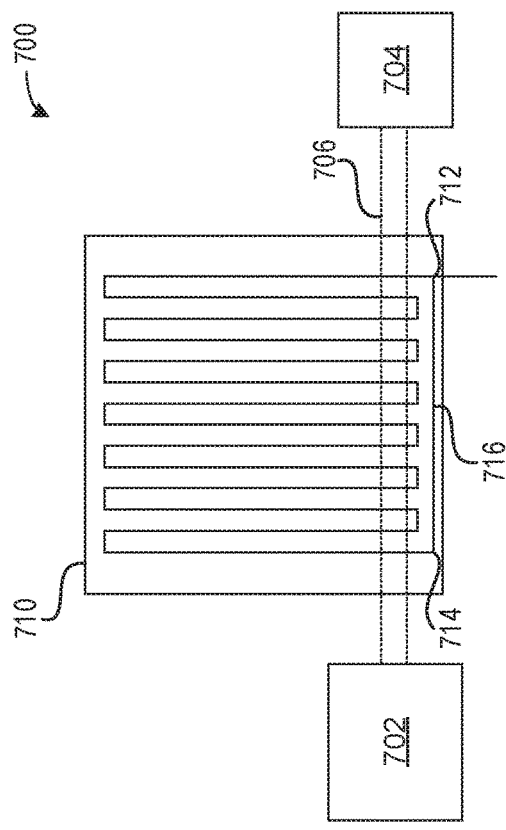
Figure 7C:
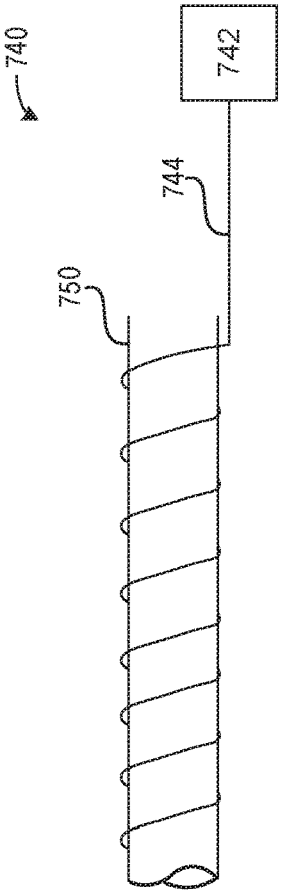

Turning now to FIG. 7D, it shows an embodiment 760 of a cylinder 770 of a conformable fuel tank. The cylinder 770 may comprise a first element 772 and a second element 774. The first element 772 and the second element 774 may include one or more of a metallic foil, a metal tank section, and a coolant jacket. In one example, the first element 772 may be a metallic foil on an outer surface of the cylinder 770 to improve heat transfer properties of the cylinder 770. In one example, the conformable tank comprises an inner polymer liner encompassed by a carbon fiber composite, wherein the metallic foil is arranged outside of the carbon fiber composite. The second element 774, which may also be the metallic foil or may be the coolant jacket, may be arranged on an opposite side of the cylinder 770. Additionally or alternatively, if the second element is a coolant jacket, then the jacket may be wrapped around the metallic foil so as to enhance thermal communication between fuel in the cylinder 770 of the conformable fuel tank and the coolant in the coolant jacket.

In this way, thermal management of a conformable fuel tank may be enhanced via a variety of active thermal management elements. As described above, the conformable fuel tank may comprise two or more recirculation pumps configured to adjust a recirculation flow rate from different portions of the conformable fuel tank. By doing this, hot spots in the conformable fuel tank may be avoided while managing a thermal load of fuel in the conformable fuel tank to mitigate a likelihood of degradation of the conformable fuel tank. The technical effect of utilizing active recirculation pumps and active cooling when available is to increase a fuel tank fill-up rate and mitigate thermal loads within the tank.

An embodiment of a system, comprises a conformable fuel tank comprising a multi-flow inlet configured to flow fuel to a first half and a second half of the conformable fuel tank, the conformable fuel tank further comprises a first recirculation passage having a first pump and a second recirculation passage having a second pump, wherein each of the first and second recirculation passages are fluidly coupled to a conduit upstream of the multi-flow inlet.

A first example of the system further comprises where the multi-flow inlet comprises a first outlet fluidly coupled to a first outlet passage configured to direct fuel to a first inlet port arranged in the first half of the conformable fuel tank, the multi-flow inlet further comprises a second outlet fluidly coupled to a second outlet passage configured to direct fuel to a second inlet port arranged in the second half of the conformable fuel tank.

A second example of the system, optionally including the first example, further comprises where the first half of the conformable fuel tank and the second half of the conformable fuel tank are fluidly coupled to one another.

A third example of the system, optionally including one or more of the previous examples, further comprises where the first half further comprises a first outlet port arranged distally to the first inlet port in the first half, wherein the first outlet port is fluidly coupled to the first recirculation passage.

A fourth example of the system, optionally including one or more of the previous examples, further comprises where the second half further comprises a second outlet port arranged distally to the second inlet port in the second half, wherein the second outlet port is fluidly coupled to the second recirculation passage.

A fifth example of the system, optionally including one or more of the previous examples, further comprises where the first outlet passage is fluidly separated from the second outlet passage.

A sixth example of the system, optionally including one or more of the previous examples, further comprises where fuel in the first recirculation passage is directed to the first half or the second half via the multi-flow inlet, and wherein fuel in the second recirculation passage is directed to the first half or the second half via the multi-flow inlet.

A seventh example of the system, optionally including one or more of the previous examples, further comprises where a coolant passage in contact with one or more storage vessels of the conformable fuel tank.

An eighth example of the system, optionally including one or more of the previous examples, further comprises where the coolant passage wraps around one or more storage vessels.

A ninth example of the system, optionally including one or more of the previous examples, further comprises where a metallic foil surrounding an outer surface of one or more storage vessels of a plurality of storage vessels of the conformable fuel tank.

A tenth example of the system, optionally including one or more of the previous examples, further comprises where the outer surface comprises a carbon fiber composite material, further comprising an inner polymer liner arranged interior to the carbon fiber composite material.

An embodiment of a storage vessel comprises a plurality of storage devices fluidly coupled in series, wherein the storage vessel comprises a plurality of inlet ports including a first inlet port and a second inlet port, a plurality of outlet ports including a first outlet port and a second outlet port, wherein the plurality of inlet ports is arranged between the plurality of outlet ports, a plurality of recirculation passages including a first recirculation passage configured to flow a product from the first outlet port to a feed passage, and a second recirculation passage configured to flow product from the second outlet port to the feed passage, a coolant passage in thermal contact with at least portions of the plurality of storage devices adjacent to the plurality of outlet ports, and a controller comprising computer-readable instructions stored on non-transitory memory thereof that when executed enable the controller to flow coolant to the coolant passage in response to a temperature sensed by a temperature sensor arranged proximally to the first outlet port or the second outlet port exceeding the threshold temperature.

A first example of the storage vessel further comprises where the instructions further enable the controller to activate a first pump in the first recirculation passage or a second pump in the second recirculation passage to flow product through the recirculation passage, to the feed passage, and back to the plurality of storage devices in response to a temperature sensed by a temperature sensor arranged proximally to the first outlet port or the second outlet port exceeding the threshold temperature.

A second example of the storage vessel, optionally including the first example, further comprises where the plurality of storage vessels is configured to store the product, wherein the product is a natural gas or hydrogen.

A third example of the storage vessel, optionally including one or more of the previous examples, further comprises a multi-flow inlet comprising a first outlet and a second outlet, wherein the first outlet is fluidly coupled to the first inlet via a first outlet passage, wherein the second outlet is fluidly coupled to the second inlet via a second outlet passage.

A fourth example of the storage vessel, optionally including one or more of the previous examples, further comprises where the instructions further enable the controller to adjust flow rates of the first pump and the second pump in response to feedback from the temperature sensor, wherein the temperature sensor is a first temperature sensor arranged at the first outlet port of the conformable fuel tank, further comprising a second temperature sensor arranged at the second outlet port of the conformable fuel tank, wherein a first pump flow rate is increased more than a second pump flow rate in response to a temperature at the first outlet port being greater than a temperature at the second outlet port.

A fifth example of the storage vessel, optionally including one or more of the previous examples, further comprises where the instructions further enable the controller to increase the second pump flow rate more than the first pump flow rate in response to the temperature at the second outlet port being greater than the temperature at the first outlet port, the instructions further enable the controller to adjust the first pump flow rate and the second pump flow rate to an equal flow rate in response to a difference between the temperature at the first outlet port and the temperature at the second outlet port being within a threshold range.

A sixth example of the storage vessel, optionally including one or more of the previous examples, further comprises where the coolant passage wraps around storage vessels comprising the first outlet port and the second outlet port, the coolant passage in contact with a metallic foil surrounding a carbon fiber composite of the storage vessels comprising the first outlet port and the second outlet port.

A seventh example of the storage vessel, optionally including one or more of the previous examples, further comprises where a housing comprising an interior volume in which the plurality of storage vessels is arranged, wherein the coolant passage is configured to flow a coolant into the interior volume, wherein the coolant fills spaces of the interior volume formed between adjacent vessels of the plurality of vessels.

An embodiment of a conformable fuel tank comprises a plurality of storage vessels fluidly coupled in series, each vessel of the plurality of storage vessels comprising an inner polymer liner encompassed by a carbon fiber composite, a multi-flow inlet comprising a first outlet fluidly coupled to a first inlet port via a first outlet conduit and a second outlet fluidly coupled to a second inlet port via a second outlet conduit, the first outlet conduit fluidly separated from the second outlet conduit, wherein the first inlet port directs fuel flow to different storage vessels of the plurality of storage vessels than the second inlet port, a first outlet port fluidly coupling a first storage vessel to a first recirculation passage and a second outlet port fluidly coupling a second storage vessel to a second recirculation passage, wherein the first storage vessel and the second storage vessel are at opposite ends of the conformable fuel tank, further comprising where the first inlet port and the second inlet port are arranged on storage vessels between the first storage vessel and the second storage vessel, the first recirculation passage is fluidly coupled to a portion of a passage upstream of the multi-flow inlet, wherein the second recirculation passage is fluidly coupled to the portion of the passage upstream of the multi-flow inlet, wherein a venturi is arranged at the portion of the passage, further comprising a first recirculation pump in the first recirculation passage and a second recirculation pump in the second recirculation passage, the first and second recirculation pumps configured to assist the venturi in drawing fuel through the first and second recirculation passages, and a coolant passage extending around at least the first storage vessel and the second storage vessel, wherein a metallic foil extends around the carbon fiber composite of the first and second storage vessels, wherein the metallic foil is configured to increase thermal communication between the first and second storage vessels and the coolant passage.

In another representation, the conformable fuel tank is a fuel tank of an alternative fuel vehicle.

Note that the example control and estimation routines included herein can be used with various engine and/or fuel cell vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types and fuel cell powertrain when used with hydrogen. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a conformable fuel tank comprising a multi-flow inlet configured to flow fuel to a first half of the conformable fuel tank and a second half of the conformable fuel tank, the conformable fuel tank further comprising a first recirculation passage having a first pump and a second recirculation passage having a second pump, wherein each of the first and second recirculation passages is fluidly coupled to a conduit upstream of the multi-flow inlet, wherein the multi-flow inlet comprises a first outlet fluidly coupled to a first outlet passage configured to direct fuel to a first inlet port arranged in the first half of the conformable fuel tank, and the multi-flow inlet further comprises a second outlet fluidly coupled to a second outlet passage configured to direct fuel to a second inlet port arranged in the second half of the conformable fuel tank.

2. The system of claim 1, wherein the first half of the conformable fuel tank and the second half of the conformable fuel tank are fluidly coupled to one another.

3. The system of claim 1, wherein the first half of the conformable fuel tank further comprises a first outlet port arranged distally to the first inlet port in the first half of the conformable fuel tank, and wherein the first outlet port is fluidly coupled to the first recirculation passage.

4. The system of claim 1, wherein the second half of the conformable fuel tank further comprises a second outlet port arranged distally to the second inlet port in the second half of the conformable fuel tank, and wherein the second outlet port is fluidly coupled to the second recirculation passage.

5. The system of claim 1, wherein the first outlet passage is fluidly separated from the second outlet passage.

6. The system of claim 1, wherein the first pump is configured to adjust a flow rate through the first recirculation passage and the second pump is configured to adjust a flow rate through the second recirculation passage.

7. The system of claim 1, further comprising a coolant passage in contact with one or more storage vessels of the conformable fuel tank.

8. The system of claim 7, wherein the coolant passage wraps around one or more storage vessels.

9. The system of claim 1, further comprising a metallic foil surrounding an outer surface of one or more storage vessels of a plurality of storage vessels of the conformable fuel tank.

10. The system of claim 9, wherein the outer surface comprises a carbon fiber composite material, further comprising an inner polymer liner arranged interior to the carbon fiber composite material.

11. A conformable fuel tank, comprising:
a plurality of storage vessels fluidly coupled in series, wherein the conformable fuel tank comprises a plurality of inlet ports including a first inlet port and a second inlet port, a plurality of outlet ports including a first outlet port and a second outlet port, wherein the plurality of inlet ports is arranged between the plurality of outlet ports;
a plurality of recirculation passages including a first recirculation passage configured to flow a product from the first outlet port to a feed passage via a first pump, and a second recirculation passage configured to flow product from the second outlet port to the feed passage via a second pump;
a coolant passage in thermal contact with at least portions of the plurality of storage vessels adjacent to the plurality of outlet ports; and
a controller comprising computer-readable instructions stored on non-transitory memory thereof that when executed enable the controller to:
flow coolant to the coolant passage in response to a temperature sensed by a temperature sensor arranged proximally to the first outlet port or the second outlet port exceeding the threshold temperature.

12. The conformable fuel tank of claim 11, wherein the instructions further enable the controller to activate the first pump to flow product through the first recirculation passage or the second pump to flow product through the second recirculation passage, to the feed passage, and back to the plurality of storage vessels in response to a temperature sensed by a temperature sensor arranged proximally to the first outlet port or the second outlet port exceeding the threshold temperature.

13. The conformable fuel tank of claim 11, wherein the plurality of storage vessels is configured to store the product, wherein the product is a natural gas or hydrogen.

14. The conformable fuel tank of claim 11, wherein the instructions further enable the controller to adjust flow rates of the first pump and the second pump in response to feedback from the temperature sensor, wherein the temperature sensor is a first temperature sensor arranged at the first outlet port of the conformable fuel tank, further comprising a second temperature sensor arranged at the second outlet port of the conformable fuel tank, wherein a first pump flow rate is increased more than a second pump flow rate in response to a temperature at the first outlet port being greater than a temperature at the second outlet port.

15. The conformable fuel tank of claim 14, wherein the instructions further enable the controller to increase the second pump flow rate more than the first pump flow rate in response to the temperature at the second outlet port being greater than the temperature at the first outlet port.

16. The conformable fuel tank of claim 15, further comprising where the instructions further enable the controller to adjust the first pump flow rate and the second pump flow rate to an equal flow rate in response to a difference between the temperature at the first outlet port and the temperature at the second outlet port being within a threshold range.

17. The conformable fuel tank of claim 11, wherein the coolant passage wraps around the plurality of storage vessels comprising the first outlet port and the second outlet port, the coolant passage in contact with a metallic foil surrounding a carbon fiber composite of the plurality of storage vessels comprising the first outlet port and the second outlet port.

18. The conformable fuel tank of claim 11, wherein a housing comprising an interior volume in which the plurality of storage vessels is arranged, wherein the coolant passage is configured to flow a coolant into the interior volume, wherein the coolant fills spaces of the interior volume formed between adjacent vessels of the plurality of storage vessels.

\* \* \* \* \*